United States Patent
Richards

(10) Patent No.: US 12,206,840 B2
(45) Date of Patent: *Jan. 21, 2025

(54) LASER LOCAL DIMMING FOR PROJECTORS AND OTHER LIGHTING DEVICES INCLUDING CINEMA, ENTERTAINMENT SYSTEMS, AND DISPLAYS

(71) Applicant: Dolby Laboratories Licensing Corporation, San Francisco, CA (US)

(72) Inventor: Martin J. Richards, Gig Harbor, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,004

(22) Filed: May 24, 2023

(65) Prior Publication Data
US 2023/0300316 A1    Sep. 21, 2023

Related U.S. Application Data

(63) Continuation of application No. 17/477,545, filed on Sep. 17, 2021, now Pat. No. 11,683,473, which is a
(Continued)

(51) Int. Cl.
*G02B 27/09*    (2006.01)
*G02B 5/02*    (2006.01)
(Continued)

(52) U.S. Cl.
CPC ......... *H04N 13/398* (2018.05); *G02B 5/0252* (2013.01); *G02B 5/32* (2013.01);
(Continued)

(58) Field of Classification Search
CPC .......................... G09G 3/3426; G09G 3/3413
See application file for complete search history.

(56) References Cited

U.S. PATENT DOCUMENTS 5,491,762 A * 2/1996 Deacon ................. H04L 49/255
            385/16
6,102,552 A    8/2000 Tullis
(Continued)

FOREIGN PATENT DOCUMENTS

CN    1383023 A    12/2002
CN    1487357 A    4/2004
(Continued)

*Primary Examiner* — Nan-Ying Yang

(57) ABSTRACT

Light from an array of laser light sources are spread to cover the modulating face of a DMD or other modulator. The spread may be performed, for example, by a varying curvature array of lenslets, each laser light directed at one of the lenslets. Light from neighboring and/or nearby light sources overlap at a modulator. The lasers are energized at different energy/brightness levels causing the light illuminating the modulator to itself be modulated (locally dimmed). The modulator then further modulates the locally dimmed lights to produce a desired image. A projector according to the invention may utilize, for example, a single modulator sequentially illuminated or separate primary color modulators simultaneously illuminated.

8 Claims, 7 Drawing Sheets

Related U.S. Application Data continuation of application No. 16/193,345, filed on Nov. 16, 2018, now Pat. No. 11,146,782, which is a continuation of application No. 15/272,638, filed on Sep. 22, 2016, now Pat. No. 10,165,260, which is a continuation of application No. 14/004,406, filed as application No. PCT/US2012/029115 on Mar. 14, 2012, now Pat. No. 9,478,193.

(60) Provisional application No. 61/452,641, filed on Mar. 14, 2011.

(51) Int. Cl.

| | |
|---|---|
| *G02B 5/32* | (2006.01) |
| *G02B 19/00* | (2006.01) |
| *G02B 27/10* | (2006.01) |
| *G02B 27/14* | (2006.01) |
| *G03B 21/00* | (2006.01) |
| *G03B 21/20* | (2006.01) |
| *G09G 3/34* | (2006.01) |
| *G09G 5/10* | (2006.01) |
| *H04N 9/31* | (2006.01) |
| *H04N 13/32* | (2018.01) |
| *H04N 13/324* | (2018.01) |
| *H04N 13/363* | (2018.01) |
| *H04N 13/365* | (2018.01) |
| *H04N 13/398* | (2018.01) |
| *G03H 1/02* | (2006.01) |
| *G03H 1/12* | (2006.01) |
| *G09G 3/00* | (2006.01) |

(52) U.S. Cl.
CPC ..... *G02B 19/0014* (2013.01); *G02B 19/0057* (2013.01); *G02B 27/0905* (2013.01); *G02B 27/0988* (2013.01); *G02B 27/1026* (2013.01); *G02B 27/145* (2013.01); *G03B 21/005* (2013.01); *G03B 21/2033* (2013.01); *G09G 3/3413* (2013.01); *G09G 3/3426* (2013.01); *G09G 5/10* (2013.01); *H04N 9/3126* (2013.01); *H04N 9/3138* (2013.01); *H04N 9/3161* (2013.01); *H04N 9/3164* (2013.01); *H04N 9/3182* (2013.01); *H04N 13/32* (2018.05); *H04N 13/324* (2018.05); *H04N 13/363* (2018.05); *H04N 13/365* (2018.05); *G03H 2001/0216* (2013.01); *G03H 2001/0224* (2013.01); *G03H 1/12* (2013.01); *G09G 3/001* (2013.01); *G09G 3/346* (2013.01)

(56) References Cited

U.S. PATENT DOCUMENTS

| | | | |
|---|---|---|---|
| 6,975,294 B2 | 12/2005 | Manni | |
| 7,477,435 B2 | 1/2009 | Yonekubo | |
| 7,551,341 B1 | 6/2009 | Ward | |
| 7,588,337 B2 | 9/2009 | Koide | |
| 7,686,455 B2 | 3/2010 | Yoshimura | |
| 7,688,347 B2 | 3/2010 | Dolgoff | |
| 7,748,853 B2 | 7/2010 | Yamauchi | |
| 7,784,938 B2 | 8/2010 | Richards | |
| 7,959,295 B2 | 6/2011 | Richards | |
| 2001/0050661 A1 | 12/2001 | Noda | |
| 2002/0030792 A1* | 3/2002 | Takizawa | G03B 21/006 353/31 |
| 2005/0017948 A1* | 1/2005 | Nguyen | H01H 13/83 345/157 |
| 2006/0006797 A1 | 1/2006 | Ito | |
| 2006/0262243 A1 | 11/2006 | Lester | |
| 2007/0035706 A1 | 2/2007 | Margulis | |
| 2007/0268211 A1* | 11/2007 | Whitehead | H01J 63/06 345/55 |
| 2008/0095203 A1 | 4/2008 | Bratkovski | |
| 2008/0278807 A1 | 11/2008 | Richards | |
| 2008/0284982 A1 | 11/2008 | Richards | |
| 2009/0086150 A1 | 4/2009 | Koyama | |
| 2009/0174638 A1 | 7/2009 | Brown Elliott | |
| 2009/0225234 A1 | 9/2009 | Ward | |
| 2010/0060857 A1 | 3/2010 | Richards | |
| 2010/0171935 A1* | 7/2010 | Yamagishi | G03B 21/16 315/114 |
| 2012/0032999 A1 | 2/2012 | Seetzen | |
| 2012/0140446 A1* | 6/2012 | Seetzen | G02B 5/32 362/97.1 |

FOREIGN PATENT DOCUMENTS

| | | |
|---|---|---|
| CN | 1683950 A | 10/2005 |
| CN | 1766696 A | 5/2006 |
| CN | 101248389 A | 8/2008 |
| CN | 101416227 B | 4/2009 |
| CN | 101782715 B | 7/2010 |
| CN | 101943848 A | 1/2011 |
| JP | 2002-287249 A | 10/2002 |
| JP | 2005-025126 A | 1/2005 |
| JP | 2007-033576 A | 2/2007 |
| JP | 2007-114358 A | 5/2007 |
| JP | 2007-188041 A | 7/2007 |
| JP | 2008-083538 A | 4/2008 |
| JP | 2008-089686 A | 4/2008 |
| JP | 2008-176024 A | 7/2008 |
| JP | 2008-268465 A | 11/2008 |
| JP | 2008-292725 A | 12/2008 |
| JP | 2009-086163 A | 4/2009 |
| JP | 2009-146941 A | 7/2009 |
| JP | 2010-049236 A | 3/2010 |
| JP | 2010-256862 A | 11/2010 |
| JP | 2011-039322 A | 2/2011 |
| WO | 2002069030 A2 | 9/2002 |
| WO | 2003077013 A2 | 9/2003 |
| WO | 2010064559 A1 | 6/2010 |
| WO | 2012125754 A1 | 9/2012 |

* cited by examiner

FIG. 4
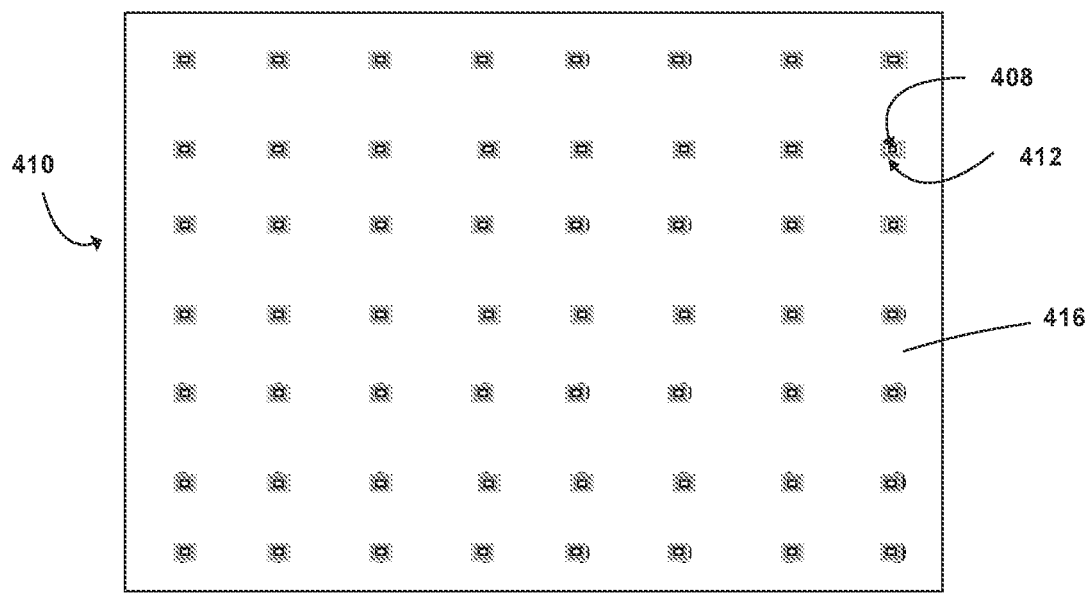
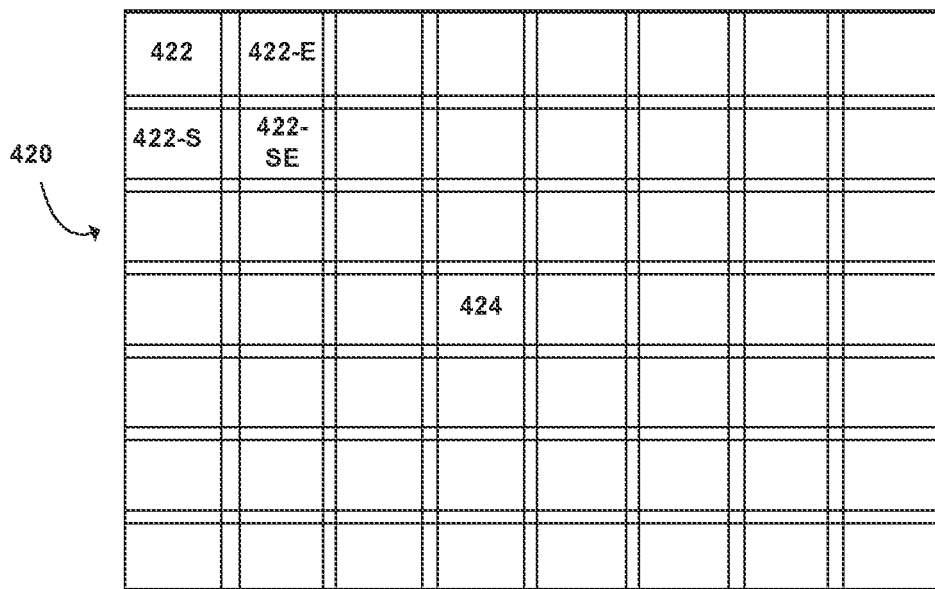

LASER LOCAL DIMMING FOR PROJECTORS AND OTHER LIGHTING DEVICES INCLUDING CINEMA, ENTERTAINMENT SYSTEMS, AND DISPLAYS

CROSS-REFERENCE TO RELATED APPLICATIONS

The present application is a continuation of U.S. patent application Ser. No. 17/477,545, filed Sep. 17, 2021, which is a continuation of U.S. patent application Ser. No. 16/193,345, filed Nov. 16, 2018, now U.S. Pat. No. 11,146,782, which is a continuation of U.S. patent application Ser. No. 15/272,638, filed Sep. 22, 2016, now U.S. Pat. No. 10,165,260, which is a continuation of U.S. patent application Ser. No. 14/004,406, filed Sep. 10, 2013, now U.S. Pat. No. 9,478,193, which is the U.S. national stage of International Patent Application PCT/US2012/029115 filed on Mar. 14, 2012, which claims priority to U.S. Provisional Patent Application No. 61/452,641, filed Mar. 14, 2011, all of which are hereby incorporated by reference in their entirety.

BACKGROUND OF THE INVENTION

The present invention relates to laser imaging systems and more particularly to laser projection systems and local dimming thereof.

Various projection systems are known including cinema projectors and home theater. Other projections of various styles are known for illuminating modulators in, for example, LCD displays. These projection systems are generally 2D systems, but growing in popularity are various configurations that implement 3D stereoscopic projectors.

3D stereoscopic projection include Anaglyph, Linear Polarization, Circular Polarization, Shutter Glasses, and Spectral Separation. Anaglyph is the oldest technology, and provides left/right eye separation by filtering the light through a two color filter, commonly red for one eye, and cyan for the other eye. At the projector, the left eye image is (commonly) filtered through a red filter, and the right image filtered through a cyan filter. The eyewear consists of a red filter for the left eye, and a cyan filter for the right eye. This method works best for black and white original images, and is not well suited for color images.

Linear Polarization 3D provides separation at the projector by filtering the left eye through a linear polarizer (commonly) oriented vertically, and filtering the right eye image through a linear polarizer oriented horizontally. The eyewear consists of a vertically oriented linear polarizer for the left eye and a horizontally oriented polarizer for the right eye. The projection screen must be of the polarization preserving type, commonly referred to as a "silver screen" because of its distinctive color. Linear Polarization allows a full color image to be displayed with little color distortion. It has several problems, these include the need for a silver screen which is expensive, fragile, and not uniform. Another problem is that the viewer must keep his head oriented vertically to avoid crosstalk from one eye to another.

Circular Polarization 3D was invented to address the problem of requiring the viewer to keep his head oriented vertically. Circular Polarization provides separation at the projector by filtering the left eye image through a (commonly) left handed circular polarizer, and filtering the right eye image through a right handed circular polarizer. The eyewear consists of a left handed circular polarizer for the left eye and a right handed circular polarizer for the right eye. A silver screen is also needed for this approach.

Shutter Glasses provides separation by multiplexing the left and right images in time. A filter for separation at the projector is not required. The eyewear consists of Shutter Glasses. These are active glasses that electronically shutter the lens in synchrony with the projector frame rate. The left eye image is first displayed, followed by the right eye image etc. Since having a direct wired connection to the Glasses in a theatre is impractical, a wireless or infrared signaling method is used to provide a timing reference for the left/right eye shuttering. This method requires an IR or RF transmitter in the auditorium. The Shutter Glasses are expensive and hard to clean, require batteries that must be frequently replaced, and are limited in their switching rate. Shutter glasses are only practical for use with D-Cinema or other electronic projection systems since very few film projectors provide the signal required to synchronize the shutter glasses with the frame rate. The method does not require a silver screen.

Spectral Separation provides separation at the projector by filtering the left and right eye spectrally. The system differs from anaglyph in that the filters for the left and right eye each pass a portion of the red, green, and blue spectrum, providing for a full color image. The band pass spectrum of the left eye filter is complementary to the band pass spectrum of the right eye filter. The eyewear consists of filters with the same general spectral characteristics as are used in the projector. While this method provides a full color image, it requires color compensation to make the colors in the left and right eye match the colors that were present in the original image, and there may be a small reduction in the color gamut compared to the gamut of the projector.

All of the above methods for providing left/right eye separation for a 3D Stereoscopic presentation can be used with either two projectors (one for the left eye and one for the right eye), or may be used with a single D-Cinema projector system. In a typical projection system, the left and right images are time multiplexed. Except for the Shutter Glasses case where no projection filters are required, this means that the projection filters must change at the L/R multiplex frequency. This can be done with either a filter wheel in the projector synchronized to the multiplex frequency, or with an electronically switched filter.

SUMMARY OF THE INVENTION

The present inventor has realized the need to improve performance, including contrast, in projection systems. The present invention includes specific arrangements of lighting and optical components that implement local dimming and increase performance of a projector or illumination system.

In one embodiment, the present invention provides a display device, comprising a plurality of laser light sources directed at a spreader configured to spread light from each light source into an overlapping pattern on a primary modulator, and a processing device configured to calculate an energization level of each laser light source based on an image signal such that the overlapping pattern is locally dimmed. The display may further comprise a secondary modulator configured to modulate the laser lights prior to illuminating the primary modulator.

The locally dimmed overlapping pattern may be configured to cause areas of the modulator corresponding to darker regions of an image carried by the image signal to have less illumination than areas of the modulator corresponding to brighter regions.

The locally dimmed overlapping pattern may be configured, on average, to cause areas of the modulator corresponding to darker regions of an image carried by the image signal to have less illumination than areas of the modulator corresponding to brighter regions.

The locally dimmed overlapping pattern comprises overlapping instances of combined primary lights and/or overlapping instances of more than 3 primary light colors. The overlapping pattern may comprise overlapping instances of red, green, blue, and cyan light colors. The overlapping pattern may comprise a sequential illumination of the modulator with primary lights such that the overlapping pattern comprises overlapping instances of a first primary light in a first time period, a second primary light in a second time period, and a third primary light in a third time period. The primary lights may comprise at least one of red, green, blue, and yellow, cyan.

The processor may be further configured to calculate an energization level for each pixel of the modulator based on the image signal and the energization level of the light sources. The energization level for pixels of the modulator may be based, at least in part, on a Light Field Simulation (LFS) of the overlapping pattern.

The display may comprise an optical block configured to direct light beams from the light sources through spreaders configured to spread and cause overlap between adjacent and/or nearby light beams and then onto the modulator.

The display may further comprise a second plurality of laser light sources directed at a second spreader configured to spread light from each light source of the second plurality into an overlapping pattern on a second modulator, and a third plurality of laser light sources directed at a third spreader configured to spread light from each light source of the third plurality into an overlapping pattern on a third modulator. The plurality of light sources may comprise a plurality of only first primary light sources, the second plurality of laser light sources may comprise a plurality of only second primary light sources, and the third plurality of light sources may comprise only third primary light sources.

The present invention is embodied as a device, apparatus, method, system, or other forms consistent with that provided herein. Portions of the device, method, system or other form of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a drawing illustrating a spreader and an illumination pattern according to an embodiment of the present invention;

DESCRIPTION OF THE PREFERRED EMBODIMENTS

Figure 1:
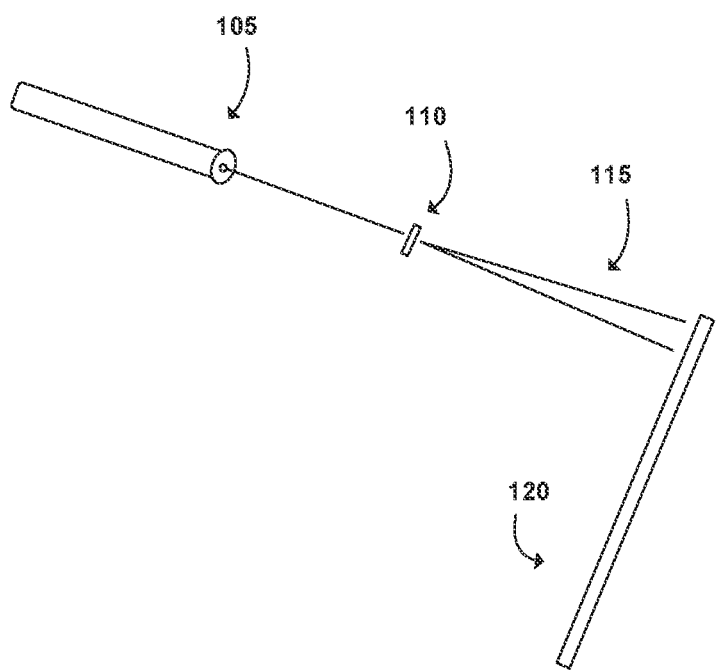
FIG. 1 is a drawing of a laser light source illuminating a modulator according to an embodiment of the present invention.

Referring now to the drawings, wherein like reference numerals designate identical or corresponding parts, and more particularly to FIG. 1 thereof, there is illustrated a laser light source 105 illuminating a modulator 120 according to an embodiment of the present invention. The laser light is passed through a spreader 110 to cause the light to spread (115). The spreading light 115 then illuminates an area of the modulator 120 that is larger than the area of light produced by the laser light source and any "native" spreading that might have occurred in the light path between the light source and modulator if the spreader were not present. The increased area of illumination by a single light source allows the use of multiple, and/or multiple overlapping laser light sources to illuminate the entire modulator.

Figure 2:
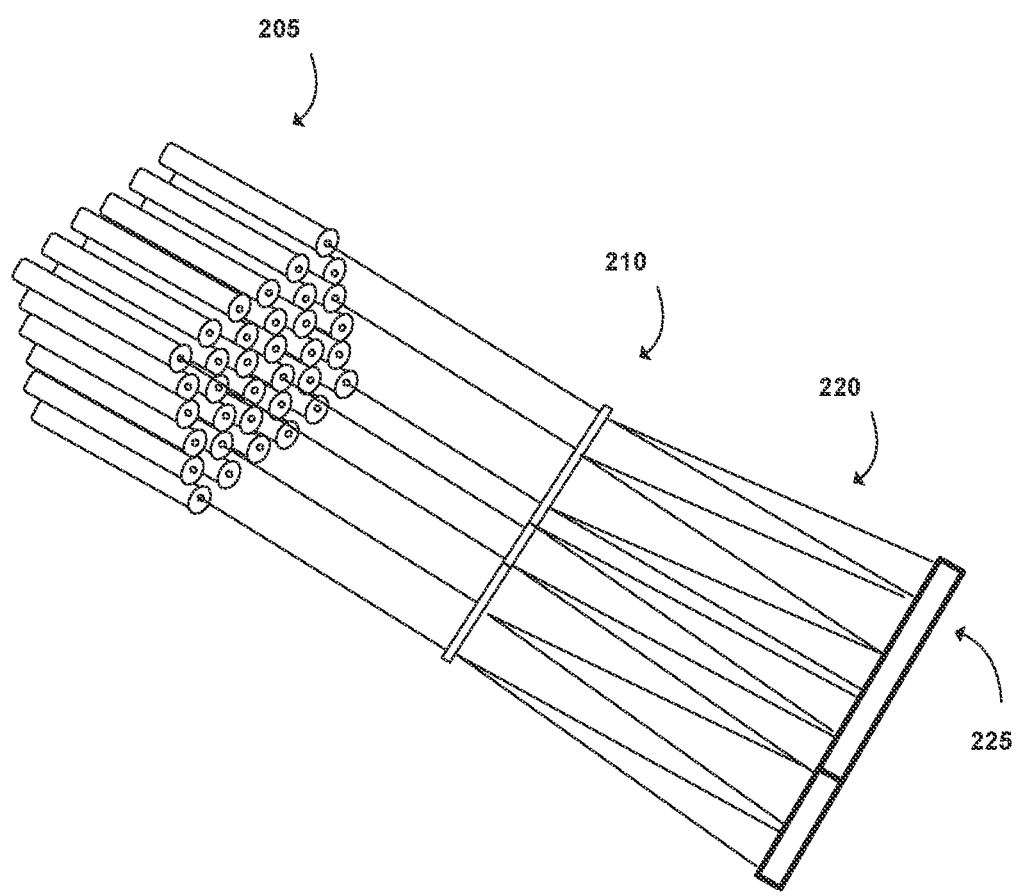
FIG. 2 is a drawing of a laser light source bundle illuminating a modulator according to an embodiment of the present invention.

FIG. 2 is a drawing of a laser light source bundle 205 illuminating a modulator 225 according to an embodiment of the present invention. Here, several of the bundled laser light sources 205 are energized and producing light. The light is spread by a spreader 210 causing the light to spread (220). The spreading light 220 then illuminates the modulator 225. As illustrated, with additional laser light energizations, the entire modulator 225 is illuminated. At different energization/brightness levels, illumination of the modulator is locally dimmed.

In one embodiment, two or more of the lights provided by the illustrated light sources may, instead of being separate sources, may be produced by a common light source and a splitter or other separating optical element/elements. In one embodiment, a series of light sources are each split multiple times to provide a full array of light beams. In one embodiment, the light beams provided by a common light source may be individually modulated with the use of liquid crystal panel and energization of specific liquid crystal cells that the individual beams are incident. The modulation of an individual beam may be accomplished by, for example, a combination of the energization level of the light source and the energization level of liquid crystal cells upon which the light or portions thereof are incident.

Turning back the exemplary embodiment of FIG. 2, additional light sources may also be energized. For example, all of the light sources may be simultaneously energized. The bundled laser light sources 205 may be, for example, any primary color in a projection system. The bundled light sources 205 may be, for example, a set of single colored laser light sources such as any of red, green, or blue, in an RGB system, or any of yellow, magenta, or cyan or other primary colors.

The bundled light sources may also be a mixed set of primary colors such as a set of red, green, and blue laser light sources. Depending on other factors of projector design, the red, green and blue laser may be programmed to be on simultaneously, or to alternate energization in a time sequence (e.g., T1 energize red laser, T2 energize green laser, and T3 energize blue laser). The time period may be sequential, repeated, or interspersed with other intervals, such as blanking intervals. The time period may be adjusted, such that one of the colors may have a longer time period than others, and the time periods for one, more, or all of the colors may be variable.

In one embodiment, the time periods (or number of time periods) for each color are determined based on image data. For example, in darker scenes, the time periods may be decreased. In scenes with specific color requirements, the predominate colors may be increased (e.g., blue sky scenes may utilize an increased blue time period). In concert with such time period adjustments, flash periods may be correspondingly adjusted.

In another embodiment, the time period may also be adjusted based on characteristics of the projector or light sources themselves. For example, projectors with higher light loss in a specific color may increase the time period for the color. A malfunctioning laser or laser bank may also be compensated for by adjusting the time period or other parameter of laser energization. Timing of energization of individual lasers of the same color may also vary within a corresponding energization time period. Such timing may be for example to match an energization pattern of the modulator(s) or other elements (e.g., filters, shutters, polarizers, etc), including mechanical movement within the image chain.

Any form of Pulse Width Modulation (PWM) may be utilized. However, a frequency at which the PWM occurs must be considered. In the case of a DMD modulator implementation the PWM frequency must not match the DMD modulator frequency, which could cause either no benefit (laser on only when mirror is reflecting into the image chain) or no illumination (laser not on when positioned to reflect into the image chain). In one embodiment, PWM of the lasers is implemented at a frequency much higher than a switching frequency of the modulator(s) in the projector or display (e.g., greater than 400 MHz for DMD, or greater than 60 FPS on a common LCD).

Amplitude modulation of the lasers may also be utilized.

Figure 3:
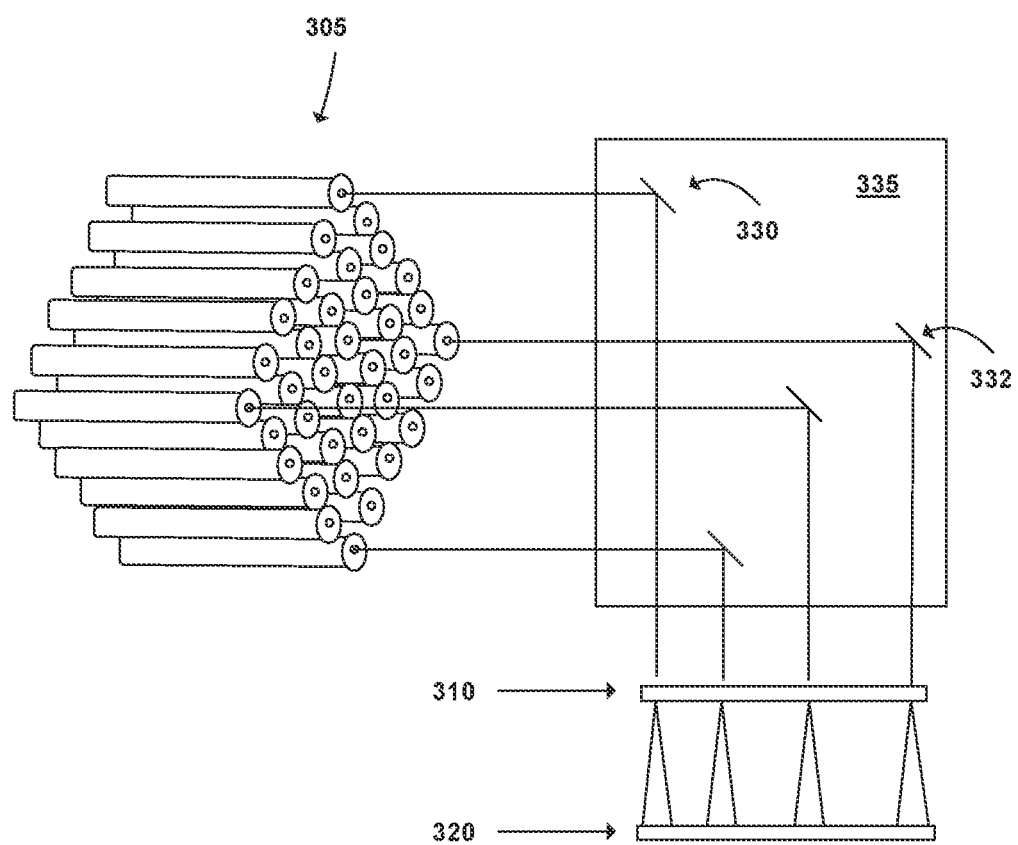
FIG. 3 is a drawing of a light source bundle and a multiple redirection block according to an embodiment of the present invention.

FIG. 3 is a drawing of a light source bundle 305 and a redirection block 335 according to an embodiment of the present invention. As illustrated, the re-direction block 335 is a multiple re-direction block in that it receives lights from a plurality of light sources (light source bundle 305) and re-directs individual beams of the light sources toward a modulator 320. The re-direction is provided by optical elements (e.g., optical elements 330 and 332). The optical elements may be, for example, a reflector or a beam splitter (e.g., one portion of the split beam directed towards modulator 320, the other portion towards a second modulator) (e.g., a splitter configured to pass one light beam and reflect another into a same or similar optical path). The optical elements may be mirrors or silverized surfaces embedded in the optical block. The optical elements may also be an impression or other permutation in the optical block that causes a total internal reflection. More than one optical element (or reflector) may be utilized in each optical path.

A spreader 310 is also shown and intended to illustrate the case of a non or low spreading light sources (e.g., laser light sources) which are then spread to illuminate the modulator 320. However, as with all such exemplary embodiments described herein, such configurations are not limited to laser light implementations. And, a selection of energized light sources are shown for illustrative purposes. However, as discussed above, all of the light sources may be energized, or a selection may be energized, they may be energized at different times (e.g. Pulse Width Modulation PWM, and/or they may be energized at different energy levels (e.g., amplitude modulation).

In one embodiment, the redirection optics and spreader/spreading function are combined. For example, the reflectors may also include any of lenslets, diffusers (e.g., holographic), or other optics to perform spreading which may be utilized to replace the function of spreader 310.

Typically, the selected energized light sources will provide enough coverage for the entire modulating surface of the modulator 320 if brightness is needed (e.g., for completely dark or black portions of an image, the modulator may not need to be illuminated). Optionally, in cases where a totally dark region of an image or scene is near to one that is partially or fully illuminated (e.g., either spatially or temporally) some illumination may be provided to the dark region (which may take the form of a gradual fade to black). In one embodiment, a fade to black rate is adjusted in areas within the "dark" region based on image data such as temporal image changes, the relative brightnesses of nearby regions, or other factors (including optical performance of one or more components of the imaging system).

In one embodiment, a broken or malfunctioning light source is detected and algorithms recognizing the failure also adjust internal parameters such as fade to black rates or the brightness/modulations of other light sources to compensate for the malfunction. Sensors in the image chain can be placed to provide real-time performance feedback and any necessary adjustments to improve display performance, or compensate for malfunctions, can be made on-the-fly in real-time during image display or projection.

In one embodiment the optical pathlengths of the light sources are matched. For example, when using an optical block such as that illustrated in FIG. 3, the light sources may be moved upstream or downstream relative to each other based on the relative distances between the light sources and their corresponding redirection element (e.g., light source for reflector 330 may be downstream relative to reflector 332). The lightpaths may be equalized by adjusting other elements in the optical path as well.

FIG. 4 is a drawing illustrating a spreader 410 and an illumination pattern 420 according to an embodiment of the present invention. The spreader 410 comprises a series of spreader elements (e.g., spreader element 412). The spreader elements are, for example, disposed on or in a substrate 416. The spreader elements may be constructed, for example, using layers of lens materials, diffusers, 414, and possibly shutters, light guides, and/or optical dividers (not shown). In one embodiment, the spreader element comprises a lens subelement targeted by one or more light sources/beams, followed by a diffuser subelement, and the diffuser subelement including reflective optical walls that direct the spread of the light in a manner that fills a predetermined illumination pattern on a downstream modulator.

In one embodiment, the spreader is constructed using a holographic material. The holographic material diffuses the light at a pre-determined angle or with a predetermined Point Spread Function (PSF). Compared to a typical diffuser, the holographic diffuser emits light at a controlled angle and/or in a limited PSF. In one embodiment, the spreader is a single layer of a holographic diffuser, and in other embodiments, sub-elements of the diffuser comprise holographic material. The holographic diffuser or materials may be used in conjunction with other optical elements.

Typically, the spreader causes the light to spread in an even distribution. However, embodiments include sub-elements that have properties that vary in order to implement an illuminating pattern that is not homogeneous or isotropic.

The illumination pattern 420 illustrates an exemplary mixing of light from the various light sources which includes an overlap at edges of adjacent light sources' illumination patterns. For example, illumination area 422 overlaps on its east-side with illumination pattern 422-E, on its south-side with illumination pattern 422-S, and on its southeast corner with illumination pattern 422-SE. Illumination pattern 424 overlaps with the eight illumination patterns surrounding illumination pattern 424. All of the patterns together from the illumination pattern on the modulator.

Preferably, the illumination patterns are proportional to a display or screen size of the device or system by which the desired or resulting images are viewed. In a 16:9 screen, the illustrated illumination areas would themselves be of a shape have a 16:9 ratio. However, other sizes, shapes or relative ratios may be utilized.

Figure 5:
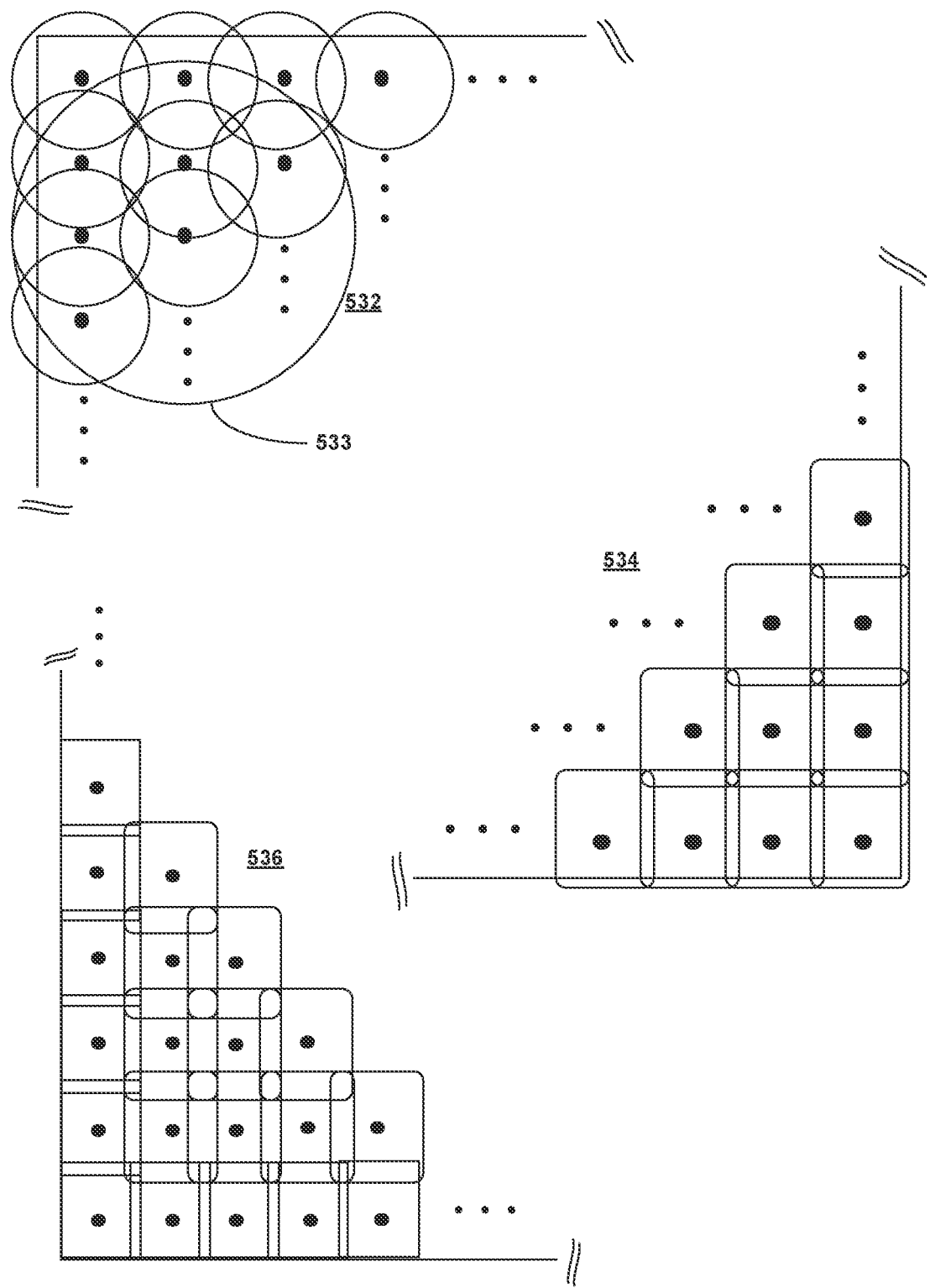
FIG. 5 is a drawing illustrating various example illumination patterns according to the present invention.

FIG. 5 is a drawing illustrating various example illumination patterns according to the present invention. The illustrated illumination patterns include a black dot that indicates an approximate illumination pattern that would occur without spreading from the light source. The illumination patterns may be produced by natural spreading initiated by a reflector around each light source, natural spreading only, or, and particularly in the case of laser light sources (either individual light sources or split beams), spreading due mainly to a spreader element in the upstream light path. Still, in each case, the black dot is provided for reference.

Illumination pattern 532 is provided by a circular type of spreading or Point Spread Function (PSF) of the light. Illumination pattern 534 is provided by a rectangular-like spread function (e.g., spreader and/or PSF of the light). Illumination pattern 536 illustrates a mixed overlap where illumination areas in an interior of the entire illuminated area are mixed more heavily (more overlap) compared to illumination areas at the edges. The relative mixing between areas may be gradually changed across the entire illuminated area either increasing or decreasing towards a central area. Ultimately, such mixing is produced on a surface of a modulator or other component of an optical, display, or projection system.

Although mainly shown for illustrative purposes as overlapping edges of adjacent light sources/PSFs, the invention includes a wider footprint or PSF of each light source which may, for example, encompass central areas of the illumination pattern of a predetermined number of light sources. For example, a light source may have a PSF that encompasses areas illuminated by 9 or more other light sources (e.g., example PSF 533) (e.g., more than just adjacent illuminated areas overlap). For example, the spreading of a first light source fully illuminates an area immediately surrounding a central point of the first light source's illumination pattern, and fully illuminates an area immediately surrounding the central points of illumination by adjacent light sources. Depending on the number of areas or light sources, this may continue for one or more levels. The first light source may then also partially illuminate areas immediately surrounding central points of illumination by light sources adjacent to those whose illumination patterns are fully illuminated by the first light source.

Figure 6:
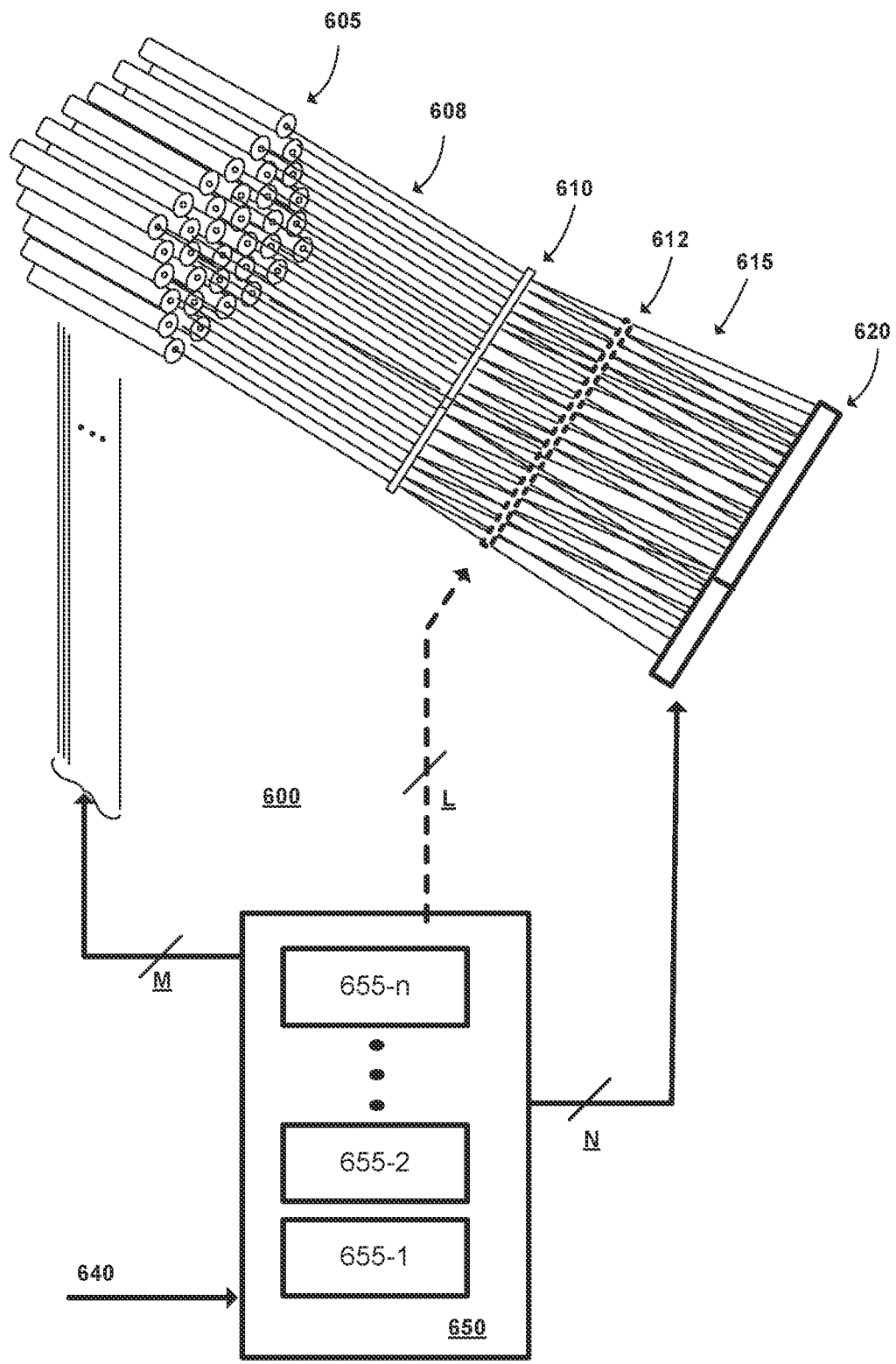
FIG. 6 is a drawing illustrating a system and processing associated with various embodiments of the present invention.

FIG. 6 is a drawing illustrating a system 600 and processing associated with various embodiments of the present invention. An array of laser light sources 605 provides narrowband illumination beams 608 which are directed at an arrayed spreader which operates to spread the narrowband laser lights. The spread lights 615 then illuminate modulator 620.

Modulator 620 may be an LCD panel, a Digital Mirror Device (DMD), a liquid Crystal on Silicon (LCOS) chip, or other modulation/light valve devices. The modulator selection may be decided based on other architectural factors of the system being built. The modulator may be transmissive or reflective and may be oriented at an angle such that the post-modulated light is reflected at an angle away from the upstream path and toward downstream portions of the image chain.

Preferably, the illumination of modulator 620 comprises a locally dimmed illumination comprising an approximation of a desired image to be displayed. The approximation is determined, for example, from an image signal 640 carrying a representation of the desired image. Processor 650 receives the image signal and determines the approximation and appropriate energization levels of the array of laser light sources 605 to produce the approximation on modulator 620 (e.g., approximation module 655-1). The approximation includes calculations based on the amount of light spreading that occurs in the image chain, which will depend on the optical characteristics of the spreader 610, and other properties of the system. The energization level of each individually controllable light source (e.g., M light sources) is signaled to the light sources (and may include additional driver hardware (not shown).

In embodiments where the light sources are grouped into colors or another denomination, the approximation signals are calculated for each group. The signals for each group likely contain some similar characteristics, and that commonality may be utilized to increase efficiency of the processing for each group.

Modulation performed by the modulator 620 is implemented to account for the illumination pattern incident on the modulator including overlapping, if any, of the illuminations originating from adjacent or nearby light sources. The modulations may be calculated by, for example, determining a simulation of the illumination field at the modulator and then energizing the modulator to alter the illumination so as to fully modulate the lights to contain the desired image when projected and/or focused at a viewing location. The modulations may also be calculated based entirely on the image signal by calculating the laser energization levels and then applying a look-up table or other conversion (equation) using both the original image signal and laser energization levels. The modulation signals include energization data for, for example, N pixels of the modulator 620.

In one embodiment, L additional "midpoint" modulations are performed. The "midpoint" modulations may be implemented, for example, by a mid-point modulator 612. The mid-point modulator may be, for example, a grayscale or color LCD panel, or, an array of optical switches (e.g., the type of switches used for communication over fiber optic cable). The mid-point modulator is a secondary modulator configured to modulate the laser lights prior to illuminating the modulator 620.

The mid-point modulator 612 may be positioned at a point after spreader 610 but before the lights overlap. In one embodiment, mid-point modulator 612 is positioned at a point after overlapping has occurred. In one embodiment, the mid-point modulator is placed before the spreader (e.g., an optical switch embodiment would have high efficiency at this position). Energization of mid-point modulator 612 may include, for example, the use of a Light Field Simulation (LFS) or other algorithm for determining a preferred modulation at the location of mid-point modulator 612. The additional modulations provided by the mid-point modulator are taken into account by either LFS or other calculations and used for determining energization of modulator 620.

In one embodiment, a mid-point modulator is constructed of optical switches configured to selectively re-direct light from its primary area on the modulator to another area on the modulator. A switch may have 2 or more directions in which the light may be directed, and, in this embodiment, the switch, for example, redirects light from "dark" areas of a modulator corresponding to dark portions of an image being modulated to "bright" areas. Corresponding changes in the LFS (or other methods for determining energization) at the modulator, along with programming of the switches themselves, is implemented, for example, in processor 650.

Figure 7:
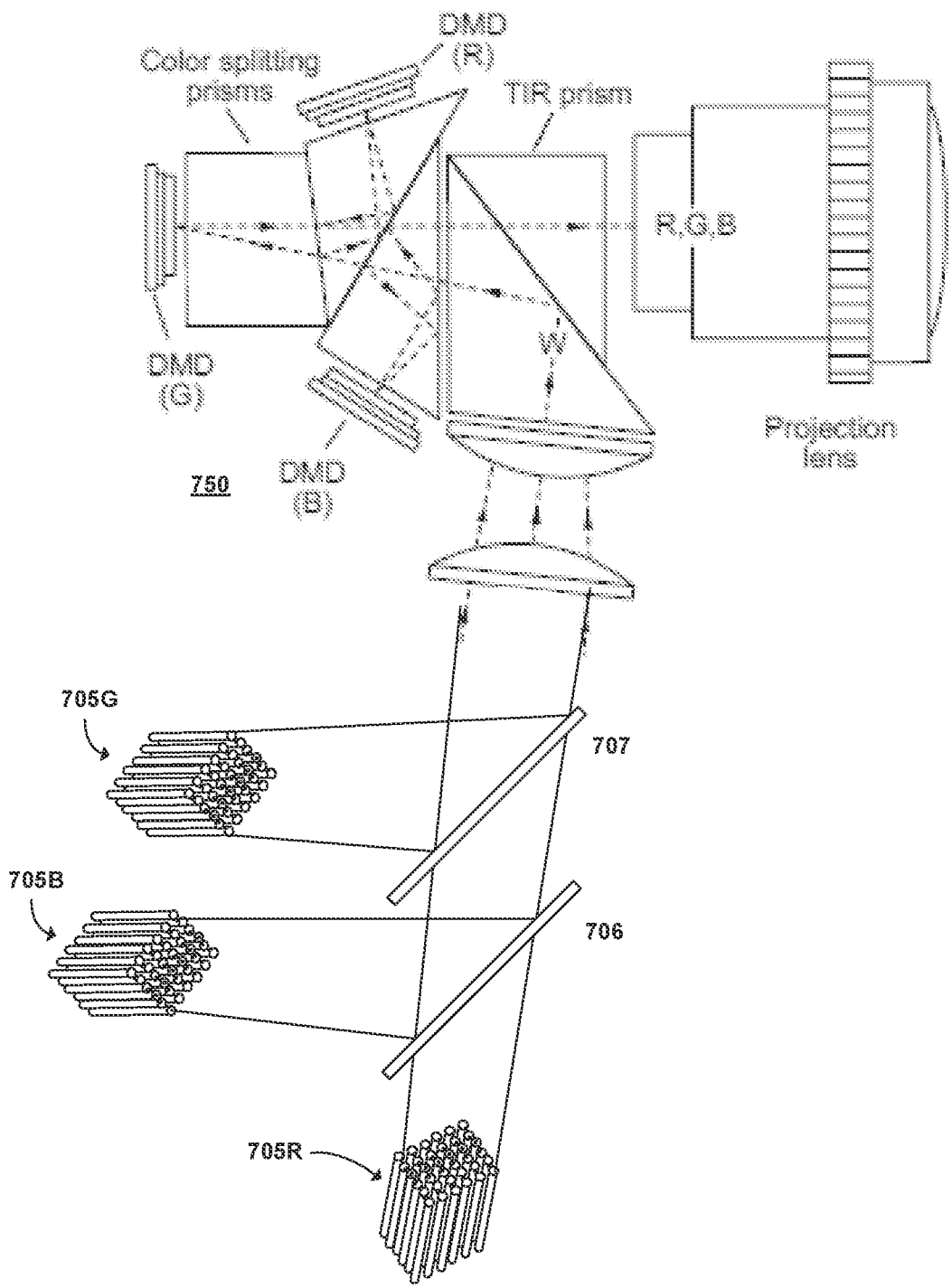
FIG. 7 is a drawing illustrating a retrofit of a projection device according to an embodiment of the present invention.

FIG. 7 is a drawing illustrating a retrofit of a projection device 750 according to an embodiment of the present invention. The projection device includes a kernel having prisms for separating and recombining colored lights and modulators for modulating the colored lights separately. In one embodiment, separate banks of lasers are provided for each of primary lights. For example, laser bank 705R producing modulated (locally dimmed) red light, laser bank 705G providing modulated green light, and laser bank 705B producing modulated blue light. The modulated lights are then spread (begin spreading) via individual spreaders (e.g., 710R, 710B, and 710G), combined and input (e.g., via optics 720) into the projector kernel, where they are separated, further modulated, re-combined, and then projected by a projection lens onto a viewing screen.

In other embodiment, a single bank of lasers is provided with a set of primary color lights and a common spreader. A common spreader may include separate or shared optics (e.g., an array of lenslets) that cause the lights to spread. The lenslets may be designed to impart a Point Spread Function (PSF) to each light such that the overlapping edges are faded compared to a central area of each individual illumination pattern causing the mixed lights to vary in a predetermined fashion (e.g., vary smoothly from one illumination area to the next). Other PSFs may also be implemented.

Other embodiments include directly illuminating separate red, green, and blue modulators with corresponding red, green, and blue laser banks (bundles) and spreaders.

Although the present invention has been described herein with reference to laser lights providing illumination, the invention may also be practiced using broadband or broaderband light sources (e.g., LEDs, nanotube based light sources, etc). In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner.

For example, when describing any part of the present invention, any other equivalent device, or other device having an equivalent function or capability, whether or not listed herein, may be substituted therewith. Furthermore, the inventors recognize that newly developed technologies not now known may also be substituted for the described parts and still not depart from the scope of the present invention. All other described items, including, but not limited to light sources, lasers, modulators, panels, processing devices, optical elements, etc should also be considered in light of any and all available equivalents. Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data (including remotely stored or executed programs or data connected via Internet or other networks such as wireless, cellular, satellite, etc., to a device performing or using one or more results of the invention (e.g., computer display, portable devices, HDTV, or cinema theater system, etc)). Such instructions may also be divided between a network server and an end-user device, such as processing performed by a remote server and a digital cinema server to produce signals necessary to drive the light sources and modulators at a cinema theater according to any one or more teachings of the present invention.

Such signals may further include specialized processing and architectures to implement 3D and/or wide color gamut, as described, for example, in issued U.S. Pat. No. 7,784,938 and co-pending U.S. application Ser. Nos.; 11/804,602, 12/530,379 by the same inventor, and "PROJECTOR AND PROJECTION SYSTEMS USING LASER LIGHT SOURCES AND RELATED METHODS FOR 3D PROJECTION AND COLOR GAMUT IMPROVEMENTS," Ser. No. 61/452,638 filed on Mar. 14, 2011.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, calculating laser energization levels and subsequent modulations in a multi-modulation system and the display, storage, or communication of results according to the processes of the present invention.

The present invention may suitably comprise, consist of, or consist essentially of, any of element (the various parts or features of the invention, e.g., light sources, modulators, optics, and processing) and their equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed:

1. A display, comprising:
   a display modulator configured to
      receive light representing a locally-dimmed approximation of an image that is different from an image to be displayed and accounts for a calculation of an amount of light spreading that occurs in an image chain, and
      modulate the light to reproduce the image; and
   a mid-point redirector configured to
      direct the light emitted onto the display modulator in an overlapping pattern of illuminated areas, and
      selectively re-direct the light axially aligned toward a first area of the display modulator, the re-direction changing an alignment of the light from the first area of the display modulator to a second area of the display modulator different from the first area;
   wherein the image chain is an optical path including the display modulator and the mid-point predictor,
   wherein the display modulator is energized according to the image data, a light field simulation of the overlapping pattern of illuminated areas on the display modulator, and the light that is selectively re-directed.

2. The display according to claim 1, wherein the light that is selectively re-directed comprises light re-directed from one or more first areas of the display modulator corresponding to one or more relatively dark portions of the image to be displayed to one or more second areas of the display modulator corresponding to one or more relatively bright portions of the image to be displayed.

3. The display according to claim 1, further comprising:
   one or more light sources that emit a corresponding one or more light beams; and
   a splitter that splits the corresponding one or more light beams into a full array of light beams,
   wherein the light is the full array of light beams.

4. The display according to claim 1, wherein changes in the mid-point redirector further include corresponding changes in the light field simulation.

5. The display according to claim 1, further comprising:
   a spreader between a source of the light and the mid-point redirector, the spreader configured to diffuse the overlapping pattern of illuminated areas.

6. The display according to claim 5, wherein the spreader comprises reflective optical walls that direct a spread of the light in a manner that fills a predetermined illumination pattern on the display modulator.

7. The display according to claim 5, wherein the spreader comprises holographic material that diffuses the light at a pre-determined angle or with a predetermined point spread function.

8. A display, comprising:
   a spreader configured to spread light into spread illumination patterns of the light;
   a display modulator configured to
      receive the light, the light representing a locally-dimmed approximation of an image through the spread illumination patterns of the light, the locally-dimmed approximation of the image is different from an image to be displayed and accounts for a calculation of an amount of light spreading that occurs in an image chain, and
      modulate the light to reproduce the image,
   wherein the image chain is an optical path including the display modulator and the spreader.

* * * * *